United States Patent
DeVerse et al.

(10) Patent No.: US 8,967,191 B1
(45) Date of Patent: *Mar. 3, 2015

(54) DEVICES, METHODS, AND ALGORITHMS FOR RAPID MEASUREMENT OF MEAN SURFACE LEVEL CHANGE OF LIQUIDS IN CONTAINERS

(75) Inventors: Richard DeVerse, Kailua-Kona, HI (US); Van R. Malan, Kailua-Kona, HI (US)

(73) Assignee: Richard Deverse, Kailua-Kona, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,500

(22) Filed: Jul. 16, 2012

Related U.S. Application Data (63) Continuation of application No. 12/270,761, filed on Nov. 13, 2008, now Pat. No. 8,220,482.

(60) Provisional application No. 61/002,788, filed on Nov. 13, 2007, provisional application No. 61/087,513, filed on Aug. 8, 2008.

(51) Int. Cl.
*F16K 31/18* (2006.01)

(52) U.S. Cl.
USPC ............... 137/412; 137/428; 73/308; 73/309; 73/313; 73/322.5; 4/508

(58) Field of Classification Search
USPC ............ 137/392, 412, 428; 73/305, 306, 308, 73/309, 310, 312, 313, 319, 322.5; 4/508
See application file for complete search history.

(56) References Cited

U.S. PATENT DOCUMENTS

| | | | |
|---|---|---|---|
| 3,538,746 A | | 11/1970 | Jacobs et al. |
| 3,732,556 A | * | 5/1973 | Caprillo et al. ............... 340/566 |
| 3,739,405 A | * | 6/1973 | Schmidt ........................... 4/508 |
| 3,848,627 A | | 11/1974 | Page |
| 4,194,691 A | | 3/1980 | Birnbach et al. |
| 4,373,815 A | | 2/1983 | Bruce |

(Continued)

FOREIGN PATENT DOCUMENTS

WO WO 2006/067148 8/2006

OTHER PUBLICATIONS

"Introduction to Load Cells", website screenshot, http://www.omega.com/prodinfo/LoadCells.html. 5 pgs.

(Continued)

*Primary Examiner* — Elizabeth Houston
*Assistant Examiner* — Ian Paquette
(74) *Attorney, Agent, or Firm* — Knobbe, Martens, Olson & Bear, LLP (57) ABSTRACT

A leak detection system for the rapid and accurate detection of the mean surface level change of a body of liquid is provided. The system is capable of sensing mean surface level changes under static or turbulent surface conditions. In one embodiment, the system includes a rigid walled sensor pod with at least one inner pod cavity that is so positioned to receive liquid from a body of liquid such that dynamic equilibrium is possible and maintained between the mean surface level of the body of liquid and the amount of liquid in the inner cavity. The system further includes a sensor assembly having a stiction free float operating in conjunction with a strain gauge, and microprocessors applying algorithms to process, display, and report the sensor data in accordance with the needs of the end user or to initiate actions for automated control functions.

4 Claims, 10 Drawing Sheets

(56) References Cited

U.S. PATENT DOCUMENTS

| | | | |
|---|---|---|---|
| 4,380,091 A | | 4/1983 | Lively |
| 4,483,192 A | * | 11/1984 | Wachter .......................... 73/311 |
| 4,491,146 A | | 1/1985 | Sveds |
| 4,591,839 A | | 5/1986 | Charboneau et al. |
| 4,612,949 A | | 9/1986 | Henson |
| 4,706,310 A | | 11/1987 | Magnes |
| 4,813,275 A | | 3/1989 | Castor |
| 4,986,113 A | | 1/1991 | Harrison et al. |
| 5,132,923 A | | 7/1992 | Crawford et al. |
| 5,157,968 A | | 10/1992 | Zfira |
| 5,315,873 A | | 5/1994 | Jin |
| 5,427,136 A | | 6/1995 | Weishew |
| 5,517,022 A | | 5/1996 | Bock et al. |
| 5,734,096 A | | 3/1998 | McGuigan et al. |
| 5,878,447 A | | 3/1999 | Mogab et al. |
| 5,971,011 A | | 10/1999 | Price |
| 5,975,102 A | | 11/1999 | Schalk |
| 6,026,683 A | | 2/2000 | Lee |
| 6,532,814 B2 | | 3/2003 | Bromley |
| 6,625,824 B1 | | 9/2003 | Lutz et al. |
| 6,700,503 B2 | | 3/2004 | Masar et al. |
| 6,851,314 B2 | | 2/2005 | Bromley |
| 6,910,498 B2 | | 6/2005 | Cazden |
| 6,964,278 B2 | | 11/2005 | Tschanz |
| 7,004,011 B1 | | 2/2006 | Spiegel |
| 7,318,344 B2 | | 1/2008 | Heger |
| 7,343,794 B1 | | 3/2008 | Pucel et al. |
| 7,370,528 B2 | | 5/2008 | Scardovi |
| 8,220,482 B1 | | 7/2012 | DeVerse et al. |
| 2002/0029633 A1 | | 3/2002 | Yekutiely et al. |
| 2004/0035465 A1 | | 2/2004 | Cazden |
| 2006/0032862 A1 | | 2/2006 | Miller |
| 2006/0096659 A1 | | 5/2006 | Reusche et al. |
| 2006/0110292 A1 | | 5/2006 | Deverse et al. |
| 2007/0211076 A1 | | 9/2007 | Kates |
| 2008/0019874 A1 | | 1/2008 | Deverse et al. |
| 2008/0144238 A1 | | 6/2008 | Cline et al. |
| 2011/0120219 A1 | | 5/2011 | Barlesi et al. |

OTHER PUBLICATIONS

Screenshot of online webpage for Username goolsnfc. Leakalyzer Exposed. YouTube [online], posted Sep. 19, 2008 [last visited Jul. 29, 2009]. Available at: < URL: http://www.youtube.com/watch?v=ZbkqNy68bIA >.

Screenshot of online webpage for Username Leaktools. Leakalyzer Set-up. YouTube [online], posted Jun. 16, 2008 [last visited Jul. 29, 2009]. Available at: < URL: http://www.youtube.com/watch?v=-J74zJx5OL0 >.

Screenshot of online webpage for Username Leaktools. Anderson Leakalyzer Demo. YouTube [online], posted Jun. 6, 2008 [last visited Jul. 29, 2009]. Available at: < URL: http:/www.youtube,com/watch?v=NzeJIs7KaYk >.

Screenshot of online webpage for Username Leaktools. Leakalyzer Pool Demo 1 YouTube [online], posted Jun. 13, 2008 [last visited Aug. 6, 2009]. Available at: < URL: http://www.youtube.com/watch?v=bsOXZZmSnqE >.

Screenshot of online webpage for Username konalabs. Kona Labs LOKOPOD LP-2750 Leak Sensor Quick Setup. YouTube [online], posted Aug. 20, 2008 [last visited Jul. 29, 2009]. Available at: <URL: http://www.youtube,com/watch?v=iXnbxtflYpM >.

Screenshot of online webpage for Username konalabs. Kona Labs LP-2750 Professional Pool & Spa leak sensor setup procedure. YouTube [online], posted Sep. 3, 2008 [last visited Jul. 29, 2009]. Available at: < URL: http://www.youtube.com/watch?v=g8A6aaKKqrk >.

Screenshot of online webpage for Username konalabs. Hawaii Island's Kona Labs Leak Detection Services. YouTube [online], posted Sep. 23, 2008 [last visited Aug. 6, 2009]. Available at: < URL: http://www,youtube.com/watch?v=I6db2MfZI7w >.

Screenshot of online webpage for Username konalabs. LP-2750 Pool Leak Sensor Quick Setup Procedure. YouTube [online], posted Sep. 23, 2008 [last visited Aug. 6, 2009]. Available at: <URL: http://www.youtube.com/watch?v=IrdhcT3cKeA >.

Screenshot of online webpage for Username konalabs. Kona Labs LokoPod(TM) LP-2750(TM) Pool and Spa Leak Sensor. YouTube [online], posted Aug. 2, 2008 [last visited Aug. 6, 2009]. Available at: < URL: http://www.youtube,com/watch?v=kyun3csfQXQ >.

Screenshot of online webpage for Username videosearchit. Florida Leak Locators finds leaks in your pool—see how! YouTube [online], posted Jul. 31, 2007 [last visited Jul. 29, 2009]. Available at: < URL: http://www.youtube.com/watch?v=bWxB2vmZZ6w >.

Screenshot of online webpage for Username ALDJosh. Swimming Pool Leak—KZSW—Temecula. YouTube [online], posted Sep. 21, 2007 [last visited Jul. 29, 2009]. Available at: < URL: http://www.youtube.com/watch?v=HRftnQM4NwM >.

Machine Translation of WO 2006/067148 to Barlesi, et al.

International Preliminary Report on Patentability, Application No. PCT/US2010/36942, dated Dec. 15, 2011, 6 pages.

International Preliminary Report and Written Opinion, Application No. PCT/US2010/36942, dated Jul. 28, 2010, 7 pages.

\* cited by examiner

Reporting in terms of inches per day

Pool leak detection embodiment

DEVICES, METHODS, AND ALGORITHMS FOR RAPID MEASUREMENT OF MEAN SURFACE LEVEL CHANGE OF LIQUIDS IN CONTAINERS

CROSS-REFERENCE TO RELATED APPLICATIONS

This application is a continuation of U.S. patent application Ser. No. 12/270,761 filed Nov. 13, 2008 which claims the benefit of priority under 35 U.S.C. §119(e) of U.S. Provisional Application No. 61/002,788 filed on Nov. 13, 2007, and U.S. Provisional Application No. 61/087,513 filed on Aug. 8, 2008, which are incorporated herein by reference in their entireties.

BACKGROUND OF THE INVENTION

1. Field of the Invention

The present inventions generally relate to liquid loss measurement and monitoring in pools, spas, ponds, water features, storage tanks, and other liquid containers, and more particularly, relate to systems and methods designed for rapid detection of leakage in a liquid container, and automatic control of fill and drain functions.

2. Description of the Related Art

Various leak detection devices and methods have been developed for swimming pools, spas, storage tanks, and other containers of fluid. Liquid leak detection devices typically function by monitoring or measuring liquid level changes in the container. However, one of the challenges in measuring liquid level changes in a container located in an open environment such as an outdoor swimming pool is that it is difficult to differentiate between actual changes in liquid level versus perceived changes caused by surface turbulence. For example, the amplitude of water waves and other surface turbulence in a swimming pool can often be greater than the amplitude of the actual changes being measured, thus causing the signal to noise ratio of the sensor response to be much less than one, which in turn can adversely affect the accuracy of the data.

Prior art leak detection devices have utilized baffles or other physical means to reduce water level fluctuations caused by surface turbulence. Some prior art liquid level change detection methods require hours of testing under static conditions in order to achieve measurements that are meaningful. Leak detection devices that incorporate more sensitive sensors capable of faster measurements often suffer from high noise due to large wave amplitudes on the surface of the liquid being measured. In view of the foregoing, there is a need for an improved system and method for rapidly and accurately detecting surface level changes in a contained body of liquid, especially where the liquid surface is exposed to turbulence due to environmental effects and other disturbances.

SUMMARY OF THE INVENTION

The systems, devices, and methods of the invention each have several aspects, no single one of which is solely responsible for its desirable attributes. Without limiting the scope of this invention, its more prominent features will now be discussed briefly. After consideration of this discussion and particularly after reading the section entitled "Detailed Description of Preferred Embodiments," one will understand how the features of the invention provide advantages that include, for example, rapid and accurate detection and monitoring of leaks in a contained body of liquid with surface turbulence.

Certain preferred embodiments of the present invention provide a system designed to rapidly and accurately measure mean surface level (MSL) changes in a contained body of fluid, such as water in a swimming pool or spa or liquid in a storage tank. In one implementation, the system incorporates a sensor assembly disposed in a sensor pod and algorithms adapted to process data from the sensor assembly to obtain meaningful and rapid results for the end user. Preferably, the appropriate combination of physical properties of the sensor system, hydrodynamic relationship between the MSL of the fluid container and the MSL of the fluid in the sensor pod, the sensitivity and range of the sensor, and the algorithmic methods developed enable rapid determination of MSL changes in a container. The system can be used as a leak sensor for pools, spas, water features and can enable determination of leaks in minutes where prior art instruments take hours or are difficult to set up due to limited range.

In one aspect, the preferred embodiments of the present invention provide a system for measuring and monitoring fluid level of a body of fluid inside a container. The system comprises a sensor pod having sidewalls defining a cavity therein. The sensor pod has an opening for fluid in the container to flow into and out of the cavity in a manner such that fluid inside and outside the cavity are in dynamic equilibrium. The system further comprises a sensor assembly disposed inside the cavity. The sensor assembly comprises a stiction free float, a spring, and a strain gauge suspended inside the cavity. Preferably, the float is positioned below the strain gauge in a manner such that changes in fluid level inside the sensor pod causes the float to move vertically, thus applying varying degrees of force against the spring, wherein the distortion of the spring is measured by the strain gauge. The system further comprises a sample tube extending from the opening in the sensor pod to a depth where surface turbulence is reduced and an analog to digital converter positioned inside the sensor pod adjacent to the sensor assembly.

In another aspect, the preferred embodiments of the present invention provide a system for automated control of fill and drain functions in a swimming pool. The system comprises a sensor pod having a cavity that is in fluid communication with the swimming pool such that water in the swimming pool flows into the cavity and reaches dynamic equilibrium. The system further comprises a sensor that is disposed inside the sensor pod, wherein the sensor is adapted to measure water level changes inside the cavity. Preferably, the sensor communicates with a remote valve to fill water into the pool when the water mean surface level falls below a predetermined lower threshold and to drain water from the pool when the water mean surface level exceeds a predetermined upper threshold.

In certain embodiments, the leak detection system disclosed herein can be used to monitor liquid storage containers. The system can also be configured as a portable device adapted for measuring the leak rate of pools, spas, lakes, ponds, water features and other containers of liquids. In other embodiments, the system can be configured as a permanent sensor installation for liquid inventory control functions and water conservation. The system can be used in functions related to the measurement of the mean surface level in liquids in containers including but not limited to water, petrochemicals, organic solvents, wet chemicals and fuels either closed or open, above or below ground. The system also relates to automated control of fill and drain functions for containers and liquid inventory monitoring such as water feature automated fill functions, water use monitoring and water conservation. One preferred implementation is an automatic fill, activity and security system for swimming pools that can be enabled by algorithms to detect leaking conditions, detect high water use, detect pool activity and can provide a pool safety function designed to alarm pool owners on pool activity that is sensed to be similar to distress or drowning. By application of different signal recognition algorithms, the sensor can be enabled to function in different ways. In one embodiment, the system can be used as a multifunction pool monitoring device. Water lost due to evaporation or splash out will be replaced and the fill algorithm will fill the pool to a predetermined level. The system provides improvement to the automatic filler by enabling complex processing of the actual mean surface level of the system so that analytical algorithms and feature recognition algorithms can be used to detect if losses of fluids are due to leaks in the pool system or are from typical use or from accidental entry and distress. If a leak is detected the owners can be alerted to initiate a repair and eliminate the loss of water resources. If the leak is from distress, emergency alerts can be issued.

The system of the preferred embodiments can be used as a rapid leak sensor for pools and spas, a professional tool that is portable and can be transported from container to container for testing in the field. In one preferred embodiment, the sensor pod is attached to an adjustable mount that allows anchoring or setting the base on the side of the pool or spa or container and lowering the sensor to depth into the liquid inside of the container under test. In another preferred embodiment, a handheld controller unit is able to receive data from the sensor pod so positioned in the container to be in contact with the water and capable of measuring changes in the mean surface level. By anchoring the sensor and having a cable or wireless connection to a handheld controller system, the user can measure the mean surface level change in the body of liquid and determine the loss or gain in the amount of liquid in the container. In one preferred embodiment as a leak sensor for pools and spas, the data would be processed for display on a graphical readout screen and the data may be processed to display the data in both graphical means and in units selected by the user. In one preferred embodiment the graphical display would collect data from the sensor digitize it and send the data to the handheld controller unit for processing. In one preferred embodiment an algorithm would collect multiple data values from the sensor in rapid succession over a period of seconds and average this data into a single data value. This data value would then be used to calculate a running calculation of a best fit of data to determine slope of change with time. This data would be processed by this one preferred embodiment to display the slope data and or the raw data on the graphical display. A number representing the leak rate will be calculated and displayed in this preferred embodiment. In one preferred embodiment the user can enter in the size and shapes of the containers surface to allow a calculation of the rate of fluid flux in terms of volume units such as gallons or liters per unit time such as hours or days. In one preferred embodiment the data can be collected for a period of time and stored in a single file representing the data for that container that can be recalled or processed at a later date.

In yet another preferred embodiment, the system can be used to monitor liquid inventory management. By using a liquid level measurement system of the preferred embodiments to provide near real-time level measurements of liquid in containers liquid inventory can be managed. Leaks can be assessed rapidly in the plumbing systems of the containers and the containers themselves. The petroleum industry has a high need for inventory control apparatus that can take measurements rapidly. Current technology takes many hours to determine leak rates.

BRIEF DESCRIPTION OF THE DRAWINGS

These and other features, aspects, and advantages of the systems and methods disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION OF THE PREFERRED EMBODIMENT

Figure 1:
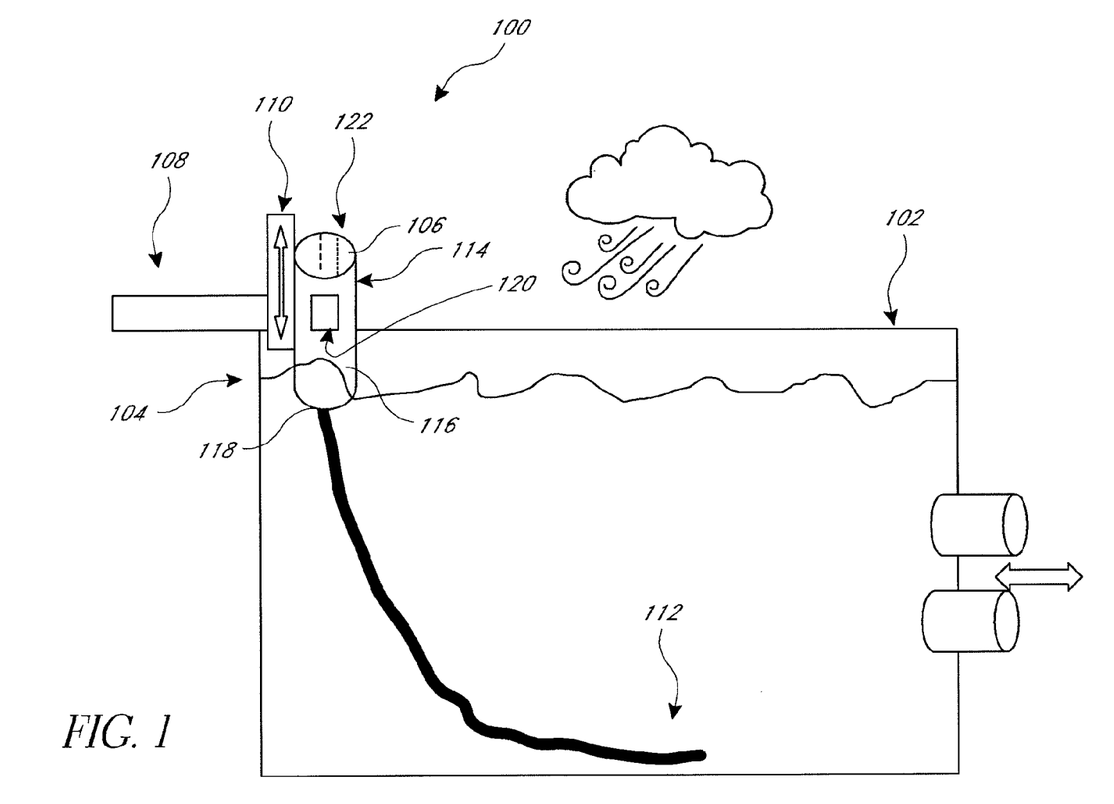
FIG. 1 is a schematic illustration of a leak detection system of a preferred embodiment of the present invention.

FIG. 1 is a schematic illustration of a leak detection system 100 according to one preferred embodiment of the present invention. In the embodiment shown in FIG. 1, the system is designed to rapidly and accurately detect water leaks in swimming pools or spas 102 where the water surface 104 can be turbulent due to the effects of weather and other disturbances. It will be appreciated that the system can also be used in other applications such as detecting fluid leaks in storage tanks of petrochemicals, organic solvents, wet chemicals, and fuels in either open or closed containers, either above or below ground.

As illustrated in FIG. 1, the system 100 generally comprises a sensor pod housing 106, a base 108, an adjustable mount 110, and a down sample tube 112. The sensor pod housing 106 comprises a rigid and thermally stable shell 114 defining an inner cavity 116. The shell 114 has an opening 118 configured to allow water in the pool to flow into the cavity 116 through the down sample tube 112 and quickly reach steady state equilibrium. Preferably, water movement within the cavity 116 is in a state of dynamic and damped equilibrium with the mean surface level (MSL) of the water in the pool. After equilibrium is reached, a change in MSL of the water in the pool will cause a corresponding change in the water MSL within the cavity 116 of the sensor pod housing 106. To reduce surface wave effects, the down sample tube 112 is preferably sufficiently long so that it can be extended to a depth below the surface of the water where there is substantially less turbulence. In one implementation, the down sample tube 112 is at least 14 feet long. In another implementation, the down sample tube 112 is made of a flexible material and is weighted at one end to allow for it to sink and remain relatively motionless in turbulence at the bottom of the pool. In yet another implementation, the down sample tube preferably comprises a sufficient length of rigid walled flexible tubing such as that commonly found in beverage delivery applications. Preferably, a proximal end of the tubing is connected to the lower end of the pod sensor housing by a water tight quick connect fitting and a distal end of the tubing has a weighted end with an opening that rests on the floor of the container under test. The opening of the down sample tube preferably should be allowed to rest as deep as possible to reduce effects of surface disturbances on the measurement. Additional baffling or perforations may be added or removed to regulate flow rates into and out of the sensor cavity. This adjustment advantageously accommodates variations in sampling conditions. Another preferred embodiment is a non-flexible rigid down sample tube. This embodiment is applicable to very turbulent bodies of fluids where the influence of such turbulence would cause the flexible tubing to distort and cause flow into and out of the sensor cavity and could be falsely interpreted as loss or gain in the system under test.

The inner cavity and down sample tube allow for damped sampling of the changes in MSL. An opening that can sample at greater depth reduces the surface wave effects. By controlling the flow of water entering the opening of the down sample tube, one can create a damped flow or flow frequency of oscillation filter that limits the range of liquid volumes in the inner cavity of the sensor pod housing relative to the localized amplitudes, which in turn better represents the MSL of the body of liquid. Additionally, the small diameter opening on the tip of the down sample tube further dampens the amplitude of the variations in the liquid level in the cavity 106 and limits the flux in volume of liquid into and out of the inner cavity as it tracks the MSL of the container under test. Water confined inside the sensor pod housing cavity preferably has standing and moving waves that change the localized surface level by large amounts that are much greater than the anticipated change in the MSL over the time of the test. In certain embodiments, flow dampening structures are disposed adjacent the opening 118 to further reduce unwanted frequencies of oscillations in the flow of water to and from the sensor pod housing 106.

In a preferred implementation, the sensor pod housing 106 is compact, portable, lightweight and has a height of between about 6 and 18 inches and an outer diameter of between about 6 and 18 inches. As further illustrated in FIG. 1, the sensor pod housing 106 is coupled to the adjustable mount 110, which is configured to allow the sensor pod housing 106 to be set at different depths, levels, and/or angles relative to the water surface 104. The adjustable mount 110 is in turned coupled to the base 108, which is configured to secure the sensor pod housing 106 to a stationary support surface such as the pool ledge. In one implementation, the base 108 and the adjustable mount 110 are made of material having a low coefficient of expansion, preferably less than that of plastics and fiber composites. Preferably, the base has a lower overall thermal expansion coefficient with temperature change and is made of a corrosion resistant material. In some embodiments, the base 108 and adjustable mount 110 have thermal expansion values of less than $19 \times 10^{-6}$/K. Thermal stability of the system, thermal isolation of the sensor pod housing cavity, vibration and movement isolation of the sensor pod housing cavity all contribute to the improvement of the measurement speed and accuracy of the system.

FIG. 1 shows that the system 100 further comprises a sensor assembly 120 disposed inside the sensor pod housing 106. The sensor assembly 120 is configured to measure and monitor water level changes inside the sensor pod housing 106. Preferably, the sensor assembly 120 has the stimulus and response in the range and resolution enabling rapid change detection relative to the amount of water in the cavity 116 of the sensor pod housing 106. In one implementation, the sensor data resolution has a minimum value of about 0.003 inch. In another implementation, the sensor working measurement range is greater than about 0.2 inch. Preferably, the sensor response data is immediately processed and interpreted according to certain algorithms to be described in greater detail below. The results can be displayed on a display readout 122 disposed on the sensor pod housing 106 and/or on a remote hand-held controller. Preferably, the system 100 is portable and can be transported from pool to pool or container to container for testing in the field.

Figure 2:
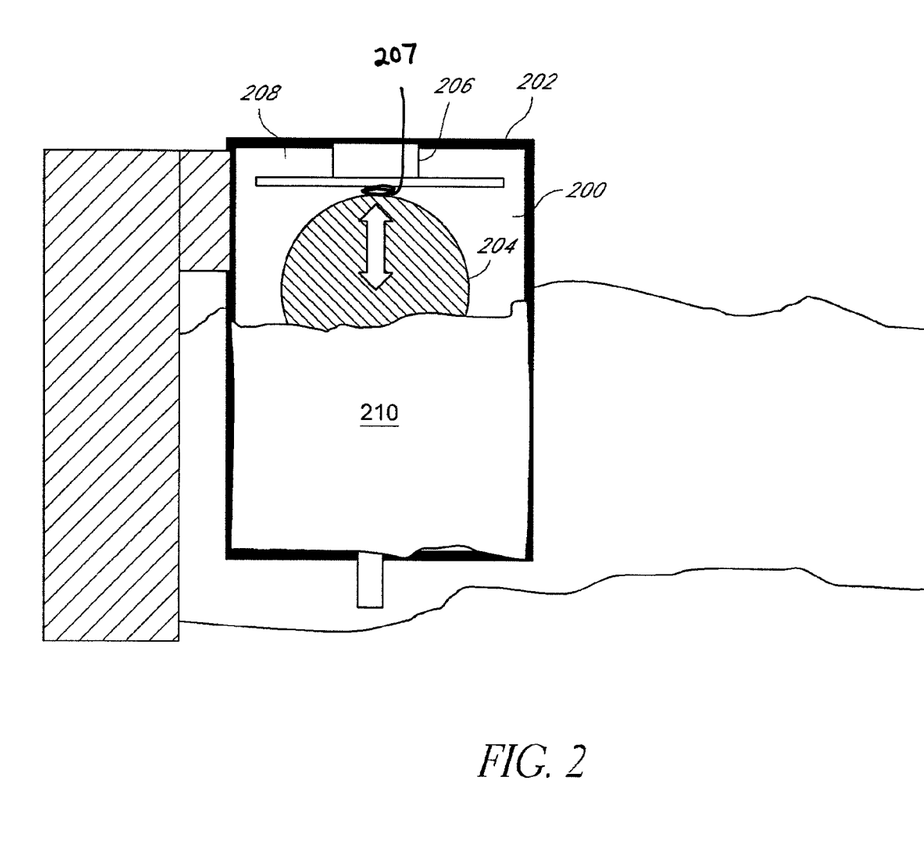
FIG. 2 is a schematic illustration of a sensor assembly of a preferred embodiment of the present invention.

FIG. 2 schematically illustrates a sensor assembly 200 of a preferred embodiment of the present invention. As shown in FIG. 2, the sensor assembly 200 is disposed inside a sensor pod cavity 202. The sensor assembly 200 comprises a spherical float 204 and a strain gauge on a load beam 206 suspended inside the cavity 202. In one embodiment, the spherical float engages a spring 207 whose distortion is measured by the strain gauge and the distortion data is used to determine the amount and direction of liquid flux in the cavity. The spherical float 204 is positioned below the strain gauge 206 in a manner such that upward buoyancy of float causes the spherical float 204 to apply a force against the spring 207. Changes in water level inside the sensor pod cavity 202 cause the float 204 to move up or down, resulting in different amounts of force being applied to the spring 207. The distortion data is processed by various algorithms to improve signal to noise ratio and to provide information that is used to determine daily water consumption rates for pools, ponds, spas, and water features, and for troubleshooting container structure and support plumbing and transport systems.

As shown in FIG. 2, in certain embodiments, the geometry incorporating a rigid mount of a force sensor sandwiched by lightweight thin surface and engaged only during use by a floating sphere allows for the application of sensitive force measurement sensors that are not damaged during transport to remote locations and that do not suffer from stationary forces during the measurement of small or zero changes in the mean surface level. During transport, the spherical float is safety pinned away from the strain gauge sensor.

Variations in the amount of force applied to the strain gauge are processed as sensor response data. Advantageously, the free floating spherical float is not mechanically connected to any other components, which allows for a stictionless movement of the float along with the water inside the sensor pod cavity and thus enabling sensitive measures of the mean surface level in short periods of time as well as providing for durability during transport. The stictionless movement of the float allows for the system to respond to very small movements in the surface of the body of liquid without sticking or being mechanically constrained until a certain threshold force is met before moving and indicating a change.

Figure 3:
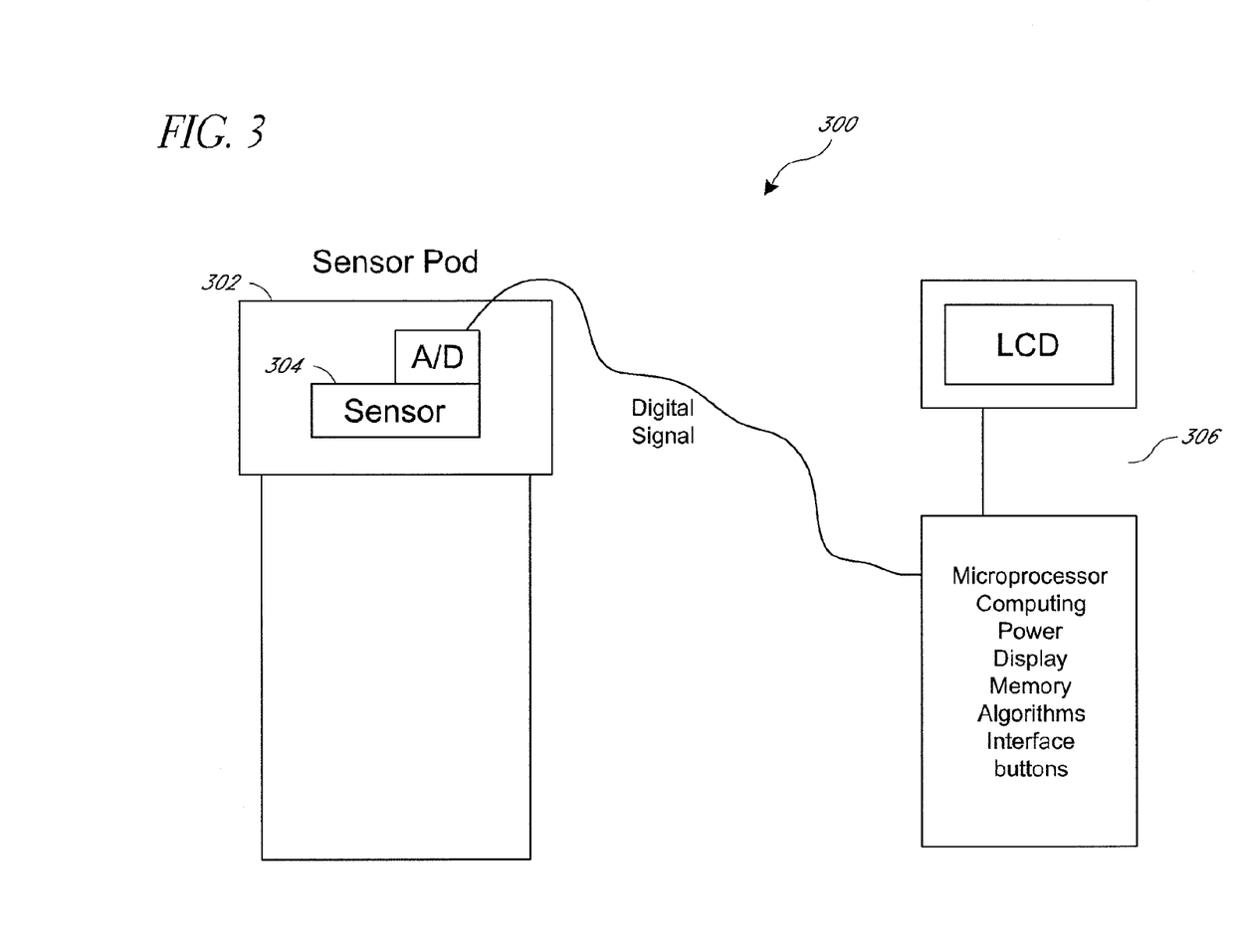
FIG. 3 is a schematic illustration of a sensor data path incorporated in system of a preferred embodiment of the present invention.

FIG. 3 illustrates the sensor data path of a system 300 according to one preferred embodiment. As illustrated in FIG. 3, the system 300 generally comprises a sensor pod 302 having a sensor engine 304 disposed therein and a remote hand-held controller 306 that is connected to the sensor pod 302 by cable, transmitter, or other connection means. The sensor engine can incorporate a variety of different types of sensors, including but not limited to, pressure sensitive optical surfaces, an interferrometric optical plate, a switch or an array of switches activated by set force values or movement of float in sensor pod housing, a fiber optic strain gauge, a fiber optical sensor, a diaphragm strain gauge on a substrate that distorts as fluid volumes increase inside the sensor pod housing, and/or a fluid flow meter. In one embodiment, the sensor engine 304 is positioned immediately adjacent to an analog to digital (A/D) converter so that the analog response signals from the sensor engine would not be required to travel any length of distance before being converted to digital signals, improving signal integrity and reducing the risk that the analog signals would be distorted by external factors before reaching the A/D converter. In some embodiments, the remote hand-held controller provides graphical display of data for constant check of data integrity and review of test history. By anchoring the sensor and having a cable or wireless connection to the hand-held controller, the user can measure the mean surface level change in the body of liquid and determine the loss or gain in the amount of liquid in the container.

Figure 4:
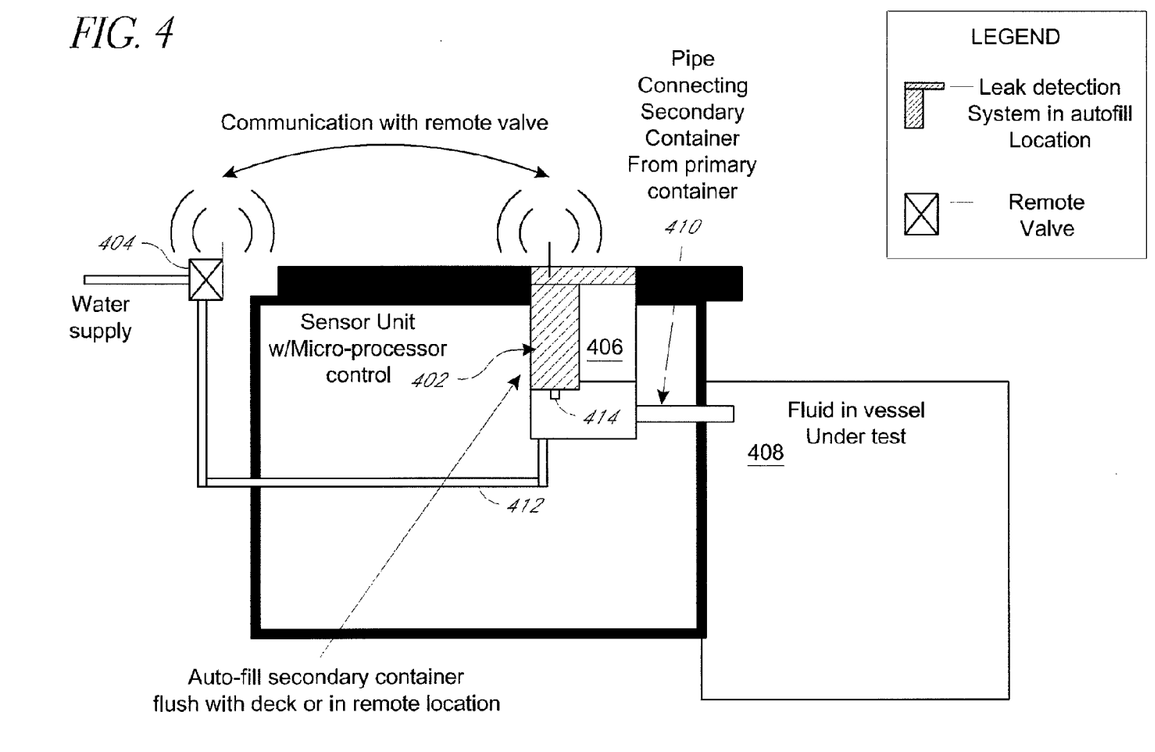
FIG. 4 is a schematic illustration of a water monitoring system of a preferred embodiment of the present invention.

FIG. 4 illustrates a water monitoring system 400 of a preferred embodiment. The system 400 can be adapted for permanent installations as a water monitoring system for pools and spas. The system 400 is generally designed to monitor for water leaks as well as tend to the losses from either leaking or evaporation by activating a remote valve. As illustrated in FIG. 4, the system 400 comprises a sensor unit 402 for measuring the water MSL and a remote valve 404 that is in communication with the sensor unit 402. The system 400 further comprises a secondary container 406, separate from the main vessel 408 under test, such as the swimming pool. The secondary container 406 has an inner cavity 408 where water or other liquid under test can enter through an interconnecting pipe 410 which equalizes the mean surface level of water in the two containers 406, 408. The secondary container 406 has plumbing 412 connected to it that allows for water to be pumped into the secondary container 406 and then equalize into the larger pool 408 via the pipe 410 connecting the two. This way by filling the secondary container, the main pool or container can also be filled. In one implementation, the sensor unit 402 is so placed as to be at a level to engage the mean surface level and measure this level. The sensor unit 402 in this embodiment has an opening 414 substantially below the mean operational surface level that allows liquid to enter into an inner cavity. In one embodiment, the inner cavity 408 houses a specially matched float and load sensor that are decoupled and not connected and only engage when fluid enters the inner cavity and causes the float to engage the force or movement sensor. At operational level, the load sensor is fully engaged and in the middle of the load sensor range of measure. In one preferred implementation, the sensor unit can be installed by retrofitting a mechanical float valve fixture with the sensor pod fixture. In another preferred implementation, the sensor unit is installed by retrofitting a mechanical float valve fixture with the sensor pod fixture. In another preferred implementation, the sensor unit is set in the secondary container at the right level and operational parameters are selected by the user via a programming interface. In this embodiment, the user can select various algorithms to enable different sensing and alarming functions. In a preferred implementation, the body of liquid is sampled continuously through the opening into the container. The remote valve which controls the water supply is in communication with the sensor unit via a cabled or wireless communication link. The signals may or may not be routed via a central computer system in the loop or part of a larger integrated system control suite.

In one preferred embodiment, the following selections are available: 1. No action/off; 2. Mode 1 Fill and Monitor; 3. Mode 2 Fill and Alarm; 4. Mode 3 Fill and Secure. In this embodiment, the off state sets the unit inoperable. The Mode 1 Fill and Monitor: fill function enables the device to activate a remote valve to fill the container as it is detected that it falls below a preset value below operational level due to evaporative losses or normal use. Monitor function monitors the slope of the water loss with time after it is detected that there is a period of non-use and a measurement can begin. If it is detected that entry by a foreign body or by rain or some other addition of fluid or raise in level occurs, the program will reset. Once a measurement time is uninterrupted and the device senses a slope greater than a preset value, it will alarm the user that a leak is detected. If the slope of this loss is not beyond the preset threshold, the unit will fill by activating a remote valve to fill the container. In some preferred embodiments, the alarm will include a calculated leak rate if a leak is indicated in inches per day or gallons per day or some other common unit of measure. This data may be signaled or delivered to a cell phone via text or to interfaced to a controller unit or computer or microprocessor and incorporated into a larger security networked system for monitoring and of property and safety functions. The monitoring system in this embodiment will alert the user to overall fluid flux as user needs dictate. The Mode 2 Fill and Alarm alerts the user to use of pool system by measuring the displacement and surface wave activity and processes this information relative to the fill rates and frequency for analysis of foreign bodies in the container. Liquid dilutions other than programmed or signaled by controller unit or algorithm and illegal or un-authorized use or entry of the container, pool, spa or water feature. Mode 3 Fill and Secure in this preferred embodiment maintains pool level and monitors for losses greater than evaporation thresholds set by user during setup. This Secure Mode 3 secures the body of fluid and immediately alerts first responders upon detection of entry by any foreign body or any loss of inventory of fluids.

In one embodiment, an algorithm for the fill function begins with step 1 which measures 2048 measurements at a frequency of 1000 Hz, followed by step 2 which entails sum measurements and divide by number of measurements. If value is not less than threshold as determined in Step 3, the process goes back to step 1. The process continues with Step 4 which entails calculating the slope of best fit line using least square regression mathematics. If the slope is greater than threshold evaporation set slope value for next 100 measurements then the process alerts leak by illuminating LED on control panel, and then turns off fill function until reset by user. If the slope is less than threshold set to evaporation and level is not below preset threshold level, then the process goes back to step 1. If the slope is less than threshold and level is below set threshold value, then the process activates fill. Measure 2048 measurements at a frequency of 1000 Hz. Sum measurements and divide by number of measurements. If level is greater than fill stop level, turn off fill function and go to Step 1. Otherwise go to step 8.

The pool auto-fill function in one embodiment may include the following features: the MSL data can be logged and recovered; threshold, alarming rates and MSL data can be managed off device by blue tooth or other wireless or wired connection; water can be remotely controlled via irrigation valve, or other wired or wireless remote valve located near or distant from container and sensor and microprocessor control unit; leak detection capabilities enable monitoring for both plumbing and structure leaks during the lifetime of the installation of the container; and sensor enables the inventory monitoring of fluids at distances.

Figure 5:
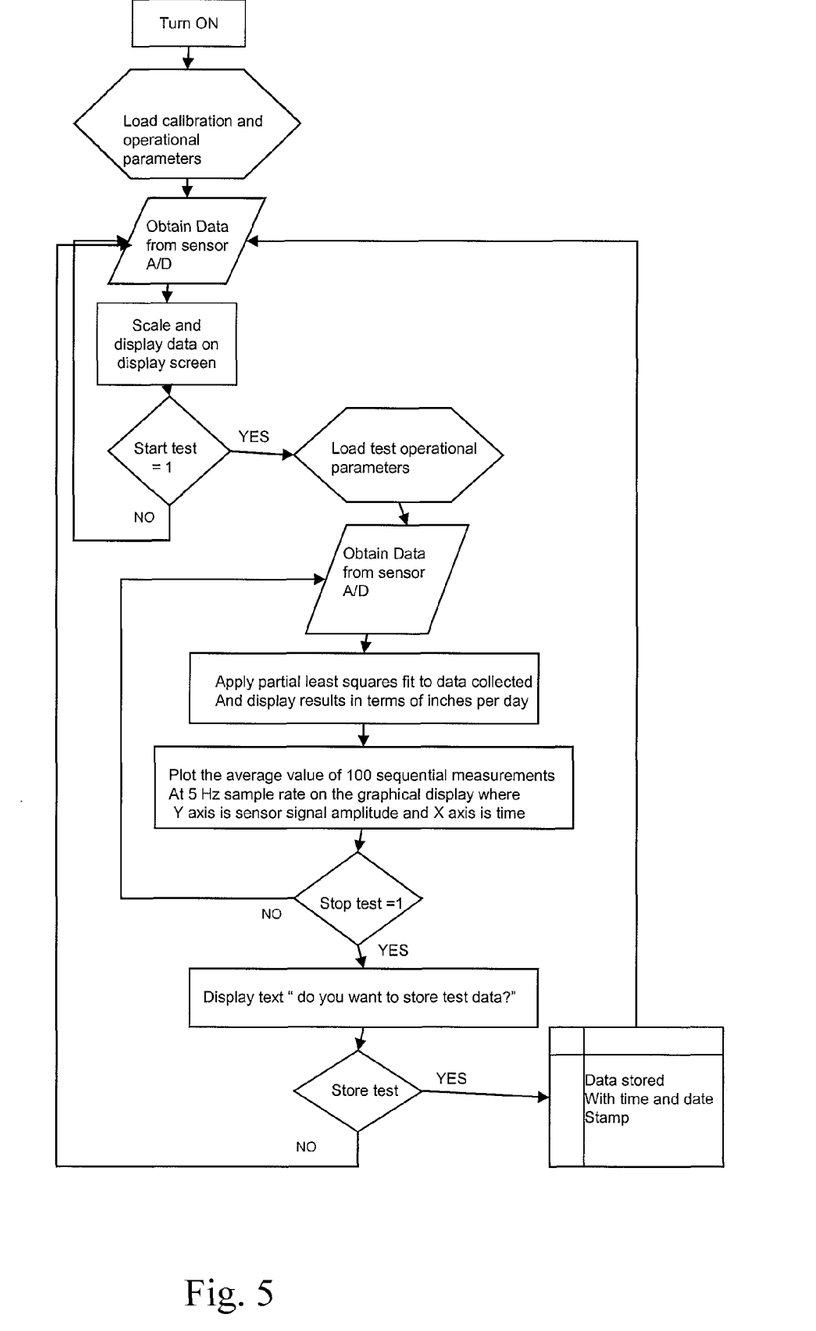
FIG. 5 illustrates a test and data algorithm of one preferred embodiment.
Figure 6:
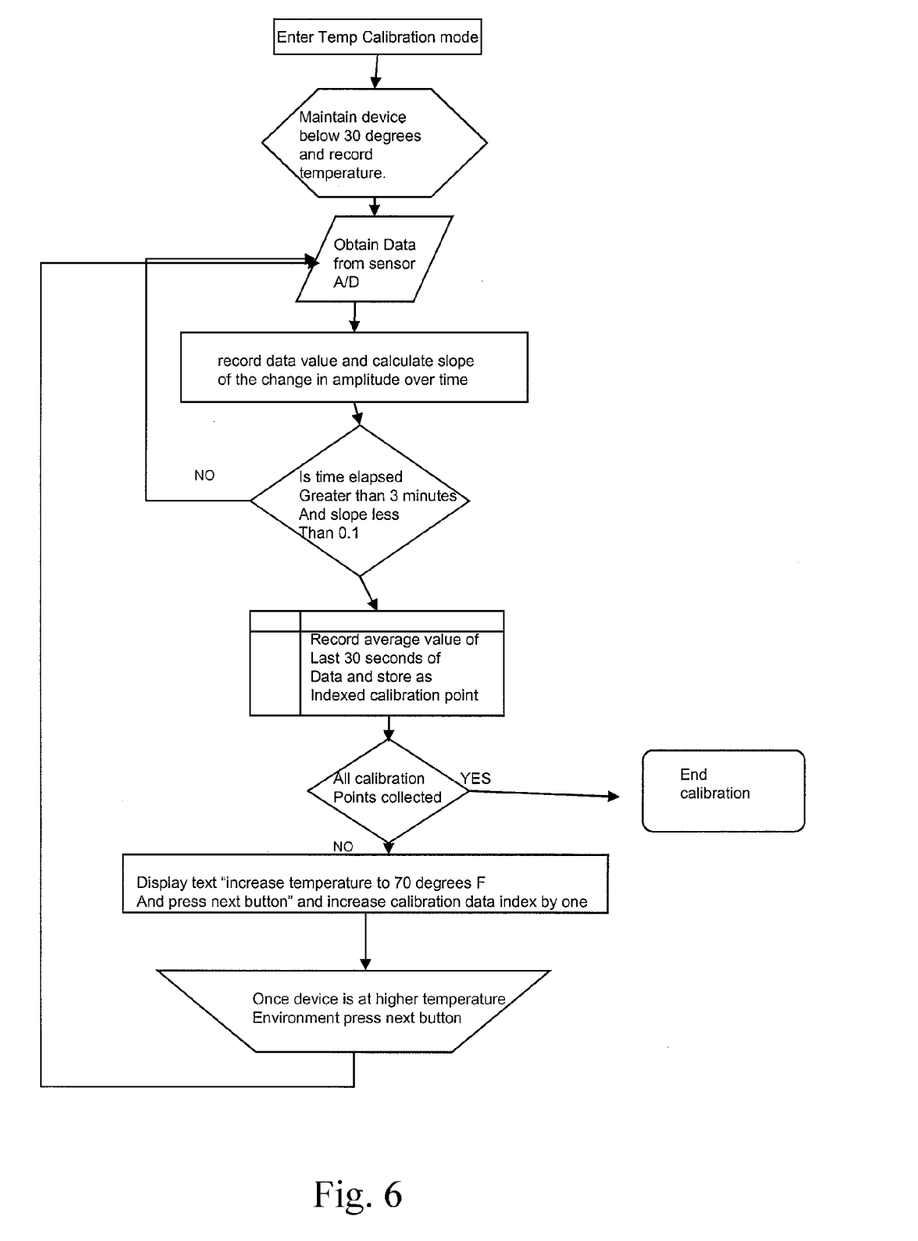
FIG. 6 illustrates a calibration algorithm of one preferred embodiment.
Figure 7:
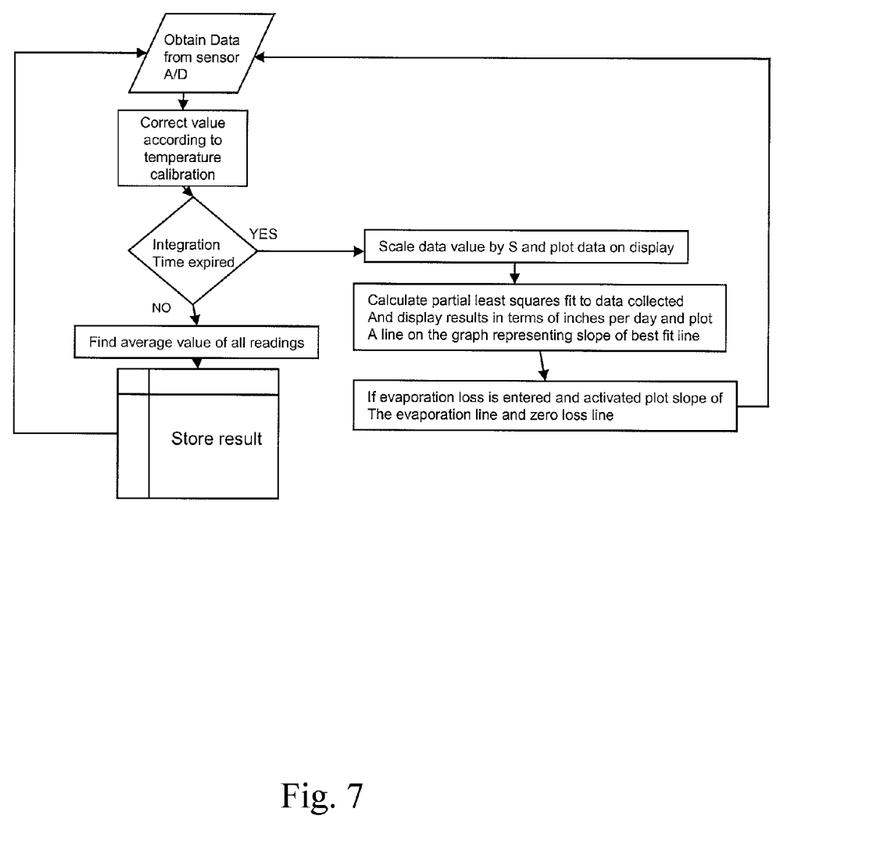
FIG. 7 illustrates an integration, scaling, and graphical display algorithm of one preferred embodiment.
Figure 8:
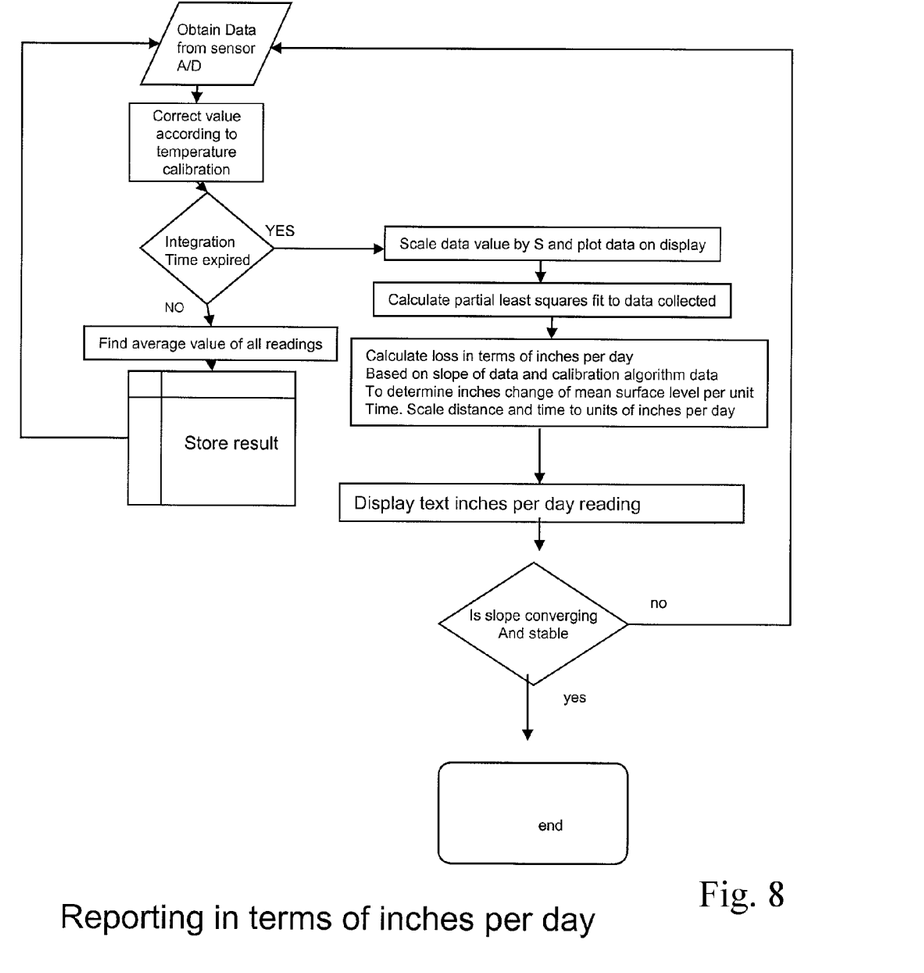
FIG. 8 illustrates a reporting algorithm of one preferred embodiment.
Figure 9:
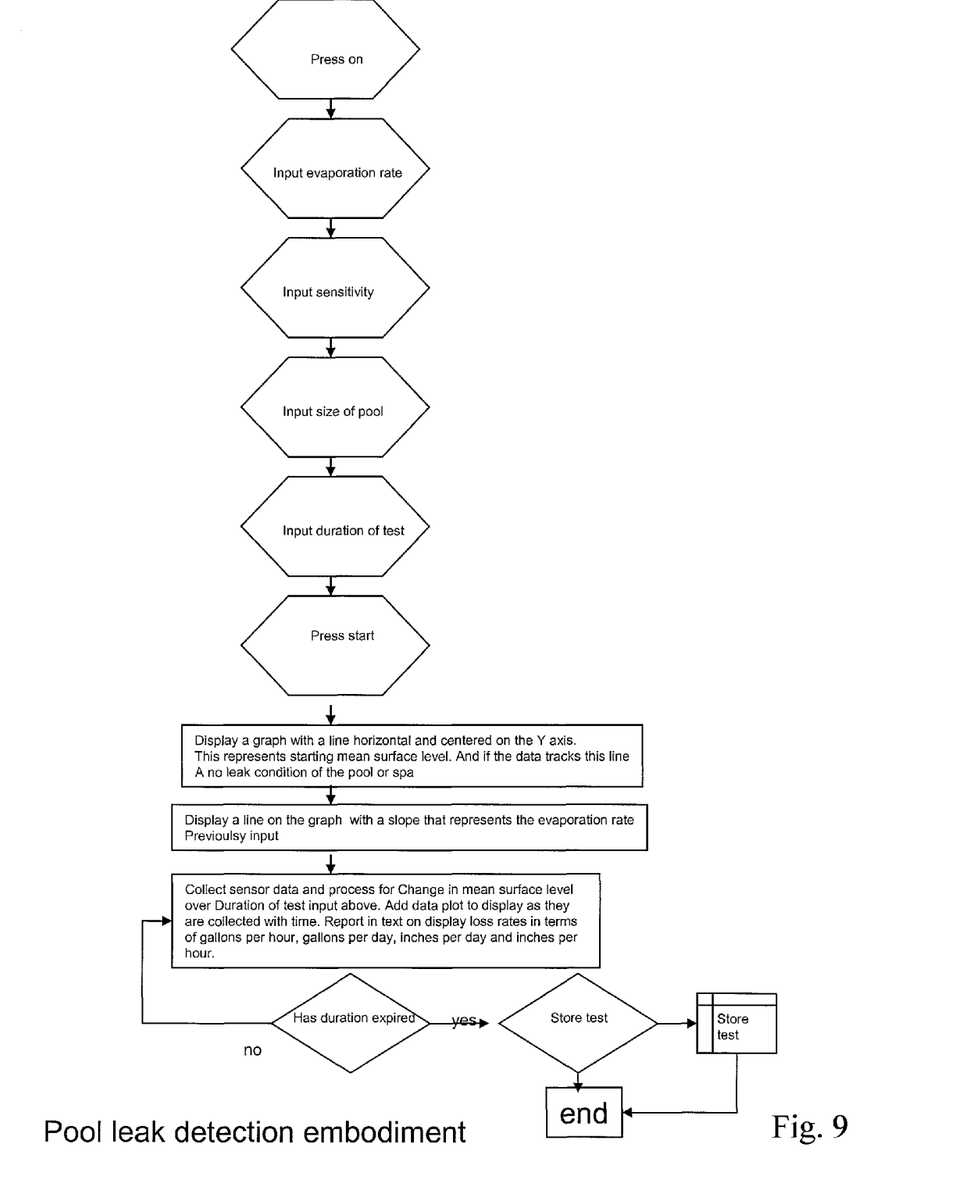
FIG. 9 illustrates a pool leak detection process flow chart of one preferred embodiment.
Figure 10:
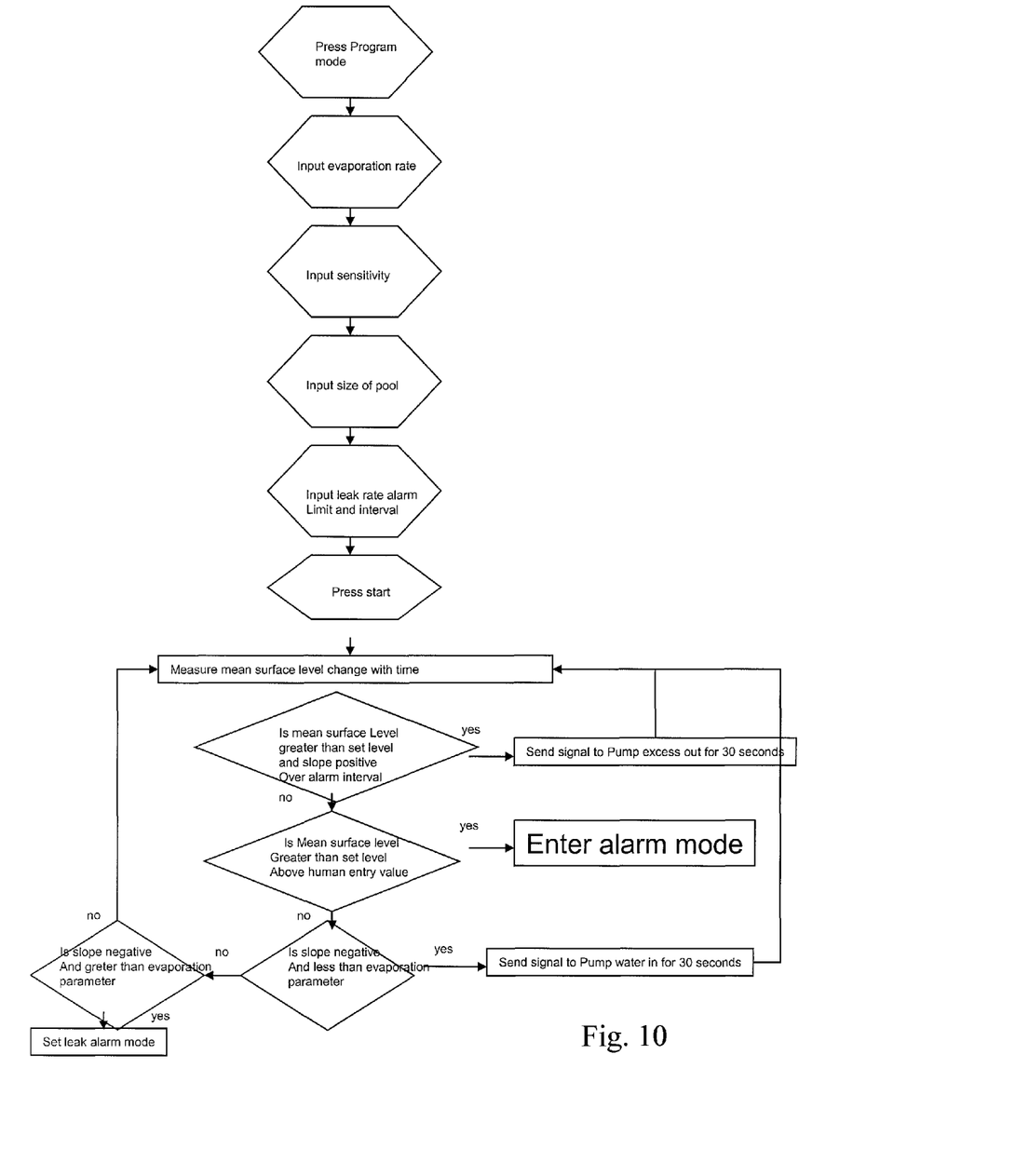
FIG. 10 illustrates a pool leak detection process flow chart of another preferred embodiment.

Various preferred algorithms have been developed to work in conjunction with the system 100 of the preferred embodiments to rapidly and accurately detect leaks in pools, spas, storage containers and the like. FIG. 5 illustrates a test and store data algorithm of one preferred embodiment. FIG. 6 illustrates a calibration algorithm of one preferred embodiment. FIG. 7 illustrates an integration, scaling, and graphical display algorithm of one preferred embodiment. FIG. 8 illustrates a reporting algorithm of one preferred embodiment. FIG. 9 illustrates a pool leak detection process flow chart of one preferred embodiment. FIG. 10 illustrates a pool leak detection process flow chart of another preferred embodiment.

Certain signal to noise ratio (SNR) and range combinations of fluid level measurement of some preferred embodiments enable more rapid measure of the change in the MSL of various remotely located bodies of water. In one preferred embodiment, the system provides rapid and reliable measurement of the MSL by utilizing a combination of a hydrodynamically damped aperture in the sensor pod and a sensor system disposed therein that is designed with almost zero restoring forces, a wide range for rapid setup, and the capability to handle the large dynamic range of the high frequency localized waves on the water surface. Moreover, in some embodiments, the analog signal stimulated and digitized by a close proximity integrated circuit sends data via a serial cable or wireless transmission to a microprocessor located in a hand-held display interface unit. Algorithms are designed to condition the data and properly display the data in meaningful terms for the end user.

The appropriate combination of physical properties of the sensor system, hydrodynamic relationship between the MSL of the fluid container under test and the MSL of the fluid in the sensor pod, the sensitivity and range of the level sensor system and the algorithmic methods enable the rapid determination of MSL changes. In one preferred embodiment as a leak sensor for pools, spas and water features this system enables determination of leaks in minutes where previous instruments took hours or were very difficult to set up due to limited range. One preferred embodiment providing rapid and reliable measurement of the MSL requires a combination of a hydrodynamically damped aperture in the sensor pod wherein a sensor system designed with almost zero restoring forces and lots of range for rapid setup and to handle the large dynamic range of the high frequency localized waves on the surface is located. The analog signal stimulated and digitized by a close proximity integrated circuit sends data via serial cable to a microprocessor located in a handheld display interface unit. In this preferred embodiment algorithms are needed to condition the data and properly display the data in meaningful terms for the end user. This preferred embodiment of a pool and spa leak detection system the mean surface level change information is needed by the end user in inches per day. When measuring a pool in the open environment the waves on the surface can be much greater than the mean surface level change and cause the signal-to-noise ratio(SNR) to be much less than one(1) when taking the MSL over time and dividing by wave height. Therefore in this preferred embodiment the information desired needs to be extracted by application of both physical and numerical means. The information is not available unless special precautions are taken to dampen the noise of wave action in the pool and to process the information in such a way as to estimate the loss in terms of MSL change in inches per day.

In some preferred embodiments the MSL information provides diagnostic and absolute data on the flux of liquid into and out of containers that can be used to assess the loss of the system and integrity of the container and associated plumbing network. Consumer water features and containers of liquids such as pools and spas and manmade lakes do not usually install permanent MSL measurement equipment that is capable of monitoring liquid losses or gains or for detecting leaks in the system. There is a need for the rapid detection of the change in the MSL for container and plumbing systems diagnostics. Prior art takes a long time to obtain measurements where the signal is greater than the noise. This preferred embodiment enables a rapid leak detection method and new rapid diagnostic capabilities. One preferred embodiment described here allows for the measurement of leaks in containers such as pools, spas, lakes, water feature and associated plumbing serving the same in the shortest possible amount of time by increasing the SNR or the signal being the MSL over the noise being the localized changes in surface level. This signal to noise must be as high as possible to obtain rapid measurements of the MSL.

Performance is measured in signal over noise (SNR). The SNR is an important factor in some applications where the rate of change of the mean surface level of a body of liquid is important. In one preferred embodiment such as a professional pool leak detection device performance is measured by rapidity of obtaining reliable measurement results on the rate of change of the mean surface level of the pool under test. There is a direct relationship between SNR and speed of obtaining a reliable rate of change measurement in the surface of a body of liquid. The combination of attributes in this one embodiment provides performance not previously available. Surface turbulence and wave action can thwart important rapid fluid level change measurements in the field. Environment and weather such as wind, rain, humidity, temperature, and other factors have a profound effect on the speed at which precise and accurate measurements can be made for a given confidence interval. Small relative changes over time of the true-surface-position of fluids made turbulent by flow or exposure are difficult to obtain and especially difficult to obtain in short periods of time. The systems of the preferred embodiments have demonstrated an improvement of measure each improved incrementally by application of device engineering, proper methodology and application of special signal processing and data processing algorithms.

Professional leak detection operations on pools, spas, lakes and water features typically required surface rate of change measurements. Prior art devices took from Days to hours. More recent apparatus have been shown capable of rapid measurements but have limited. Prior art technology applied to underground storage tanks and other fluid systems require permanently mounted devices operating over extended periods of time at low sensitivity. By permanent mounting and measuring over very long period of time being hours and days these systems can achieve high levels of precision and accuracy. The improvement disclosed herein allows for a rapid answer that can improve productivity and can improve the ability to troubleshoot broken systems as well as other liquid monitoring tasks such as inventory control.

The attributes of certain preferred embodiments enable rapid measurement of pools, spas and water features in the field of use of leak detection. The combination of attributes enables the use of more sensitive sensors for the measure of the MSL that also have greater range and sensitivity than would otherwise be possible to use. These features make the device easier to set up and use and provides a dramatic increase in the ability to conduct leak detection operations.

This one preferred embodiment also improves the range of diagnostics that one can apply to the leak detection of pools, spa, lakes and water features. This preferred embodiment is not limited to water and can be applied to any liquid and any container with a sound edge reference position.

In one preferred embodiment, the analog sensor signal of the level of fluid in the inner cavity is digitized as soon as possible and this data is transmitted to a handheld controller unit in digital form. Note that it sometimes is possible to use an analog signal to the handheld device and this description of the preferred embodiment in no way limits the scope of these claims to the digital domain. This embodiment further improves the capabilities to measure the MSL of turbulent bodies of liquids by applying special signal processing, signal conditioning and mathematical algorithms before displaying the data in relevant terms to the end user. In another preferred embodiment the sensor system can be utilized to control fill and drain functions that follow a preset user dictated routine for pool water conservation and fluid inventory management.

In another preferred embodiment, the attributes in combination allow a high performance measurement the mean surface level of the body of liquid in a very short amount of time. This time savings can be as large as 23 hours in some preferred applications and fields of use. In this field of use this one preferred embodiment provides a combination of physical parameters and data processing algorithms that enable reliable and rapid measurements of the rate of change of the mean surface level and display and record this data in terms of use by the end user. In this one preferred embodiment rapid determination of the MSL of turbulent containers of water either exposed to the elements as a pool, spa, water feature or lake or under constant operation under turbulent flow conditions is enabled.

Prototype testing of the system of one preferred embodiment has shown that resolution of 0.0001 inch and a range of 0.5 inch is sufficient for most applications where surface change is not expected to be less than 0.20 inch per 24 hour period and not more than 3.00 inch per 24 hour period. The 0.5 inch range provides for ease of rapid setup using a mobile mount that sets onto the earth or ground. Sufficient attention to the thermal expansion of materials and other factors are important as the sensitivity to thermal expansion will work to extend measurement times. In a preferred embodiment used in the field of use of pool and spa leak detection the user starts with a 20 feet by 30 feet open topped container with plumbing support systems.

In this field of use one preferred embodiment of the process for a diagnostic procedure on this system would be the following.
  A. Set the device mount securely on the edge of the container.
  B. Assemble the correct hose length to housing unit. Using a hose that is capable of being secured by weights or otherwise reaching unopened to the container floor.
  C. Turn on Sensor engine input data needed for test and results reporting if needed and note appropriate readout.
  D. Mount the sensor housing unit to the adjustment arm. Housing sensor engine. And adjust to appropriate level.
  E. Depending on measurement schema start measurement algorithm
  F. Secure results Note that this procedure could be repeated for diagnostics on pool systems that go beyond container structures but help to diagnose pump and plumbing systems. This one preferred embodiment applied to the field of use of pool and spa leak detection is not limited to this field of use.

Typical Set up procedure and data collection and one typical display algorithm for small turbulent systems.
  1. Set up device using standard device mount as shown in FIG. 1.
  2. Attach bottom tube and place other end of tube with weight at bottom of pool
  3. Turn device power on
  4. Lower device into water to red line using adjustments on device mount
  5. Wait a few seconds for readings to stabilize then press "GO"
  6. Display will readout according to the following Data is collect as fast as can be with little noise averaged over 3-10 seconds for a single data point. Display is updated every 3 seconds.
A=current reading absolute value
B=best fit slope since go time reading in inches projected to 24 hour unit period of time.
C=time elapsed in minutes
D=Delta level change since go in inches—take the average of the first three measures as start and then average the last three as end value
Display is 2× 16 and should be set up as so:
KLAA.AAA DAY B.B
MIN CC MILS DDDD Example of algorithm used to process sensor data for rapid rate of change determination.

Example uses digitized data from the sensor pod sensor.
  (1) Take a digital reading every 0.05 seconds for a period of 7 seconds and find average value of these numbers.
  (2) Scale value
  (3) Display value on graphical display of value vs. time
  (4) Record value
  (5) When there are three or more values calculate the slope of these values plotted with time using a least squares algorithm.
  (6) Using the slope of the line formed by plotting the data with time calculate the quantitative difference based on the results of the calibration function as determined either empirically by the field calibration method or pre-programmed function.
  (7) Calculate and display this value in units of absolute distance during elapsed time
  (8) Calculate and Display distance per day A field calibration Algorithm:
  (1) Set the apparatus into an 11.5" ID 5 gallon bucket.
  (2) Select the calibrate algorithm
  (3) Adjust mount to bring raw value of sensor as shown on the display to 2000 to 3000 then press red button to start the calibration measurements
  (4) Measures as recorded from the sensor are averaged over three minutes and the value is recorded.
  (5) Next steps are prompted on display to add three golf balls to displace water and cause the surface of the water to rise approximately 0.02 inch.
  (6) A prompt to press the red button starts the recording of sensor output after a delay of 1 minute.
  (7) Sensor data is recorded for a period of 2 minutes and the raw values are processed.
  (8) The known change in surface level in inches is divided by the sensor raw number difference between the last and first measure to obtain a calibration of sensor raw number output to inches.

Additional golf balls can be added and the process continued to create a linearization of the sensor response in terms of inches. Golf balls are used due to the strict standards by which they are produced in terms of size. This algorithm enables rapid surface level changes in large bodies of turbulent liquids in a few minutes that can be reported in calibrated inches per day.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A system for automated control of fill and drain functions in a swimming pool, comprising:
   a sensor pod having a cavity that is in fluid communication with the swimming pool such that water in the swimming pool flows into the cavity and reaches dynamic equilibrium; and
   a sensor disposed inside the sensor pod, said sensor is adapted to measure water level changes inside the cavity, wherein the sensor communicates with a remote valve to fill water into the pool when the water mean surface level falls below a predetermined lower threshold and to drain water from the pool when the water mean surface level exceeds a predetermined upper threshold, wherein the sensor comprises a strain gauge coupled to a load beam, and a float disposed below the load beam, the float is not mechanically connected to the strain gauge and does not engage with the strain gauge when water is not present inside the cavity.

2. The system of claim 1, wherein the sensor response data is transmitted to a hand-held controller.

3. The system of claim 1, wherein the system further comprises an analog to digital converter disposed adjacent to the sensor in the sensor pod.

4. The system of claim 1, wherein the system further comprises an alarm that is activated when the sensor response data is indicative of drowning or illegal entry into the pool.

* * * * *